United States Patent
Ishigo et al.

(10) Patent No.: US 8,147,144 B2
(45) Date of Patent: Apr. 3, 2012

(54) CONNECTING ROD BEARING FOR INTERNAL COMBUSTION ENGINES

(75) Inventors: Osamu Ishigo, Inuyama (JP); Yuichi Tomita, Inuyama (JP); Aisuke Kuwabara, Inuyama (JP); Kouki Wakita, Inuyama (JP)

(73) Assignee: Daido Metal Company Ltd., Naka-Ku, Nagoya ( * ) Notice: Subject to any disclaimer, the term of this patent is extended or adjusted under 35 U.S.C. 154(b) by 569 days.

(21) Appl. No.: 12/345,644

(22) Filed: Dec. 29, 2008

(65) Prior Publication Data

US 2009/0169141 A1 Jul. 2, 2009

(30) Foreign Application Priority Data

Dec. 28, 2007 (JP) .................................. 2007-340225
Mar. 14, 2008 (JP) .................................. 2008-065905

(51) Int. Cl.
*F16C 33/10* (2006.01)
*F16C 33/02* (2006.01)
*F16C 33/74* (2006.01)

(52) U.S. Cl. .......................... 384/288; 384/273; 384/291

(58) Field of Classification Search .......... 384/273–275, 384/286, 288, 291, 295–296, 431–432; 123/195 H, 123/196 R See application file for complete search history.

(56) References Cited

U.S. PATENT DOCUMENTS

| | | | | | |
|---|---|---|---|---|---|
| 4,235,481 | A | * | 11/1980 | Fukuoka et al. | 384/431 |
| 4,567,815 | A | * | 2/1986 | Kocher | 384/291 |
| RE32,764 | E | * | 10/1988 | Smith et al. | 384/288 |
| 5,009,522 | A | * | 4/1991 | Hahn | 384/288 |
| 6,176,621 | B1 | * | 1/2001 | Naitoh et al. | 384/291 |
| 6,868,810 | B2 | * | 3/2005 | Hojo et al. | 123/54.4 |
| 7,281,854 | B2 | * | 10/2007 | Terada et al. | 384/288 |
| 2005/0047689 | A1 | * | 3/2005 | Yamazaki et al. | 384/288 |
| 2005/0263125 | A1 | * | 12/2005 | Terada et al. | 384/288 |

FOREIGN PATENT DOCUMENTS

JP 8277831 A 10/1996
JP 2005069283 A 3/2005

* cited by examiner

*Primary Examiner* — Marcus Charles
(74) *Attorney, Agent, or Firm* — Browdy and Neimark, PLLC

(57) ABSTRACT

A connecting rod bearing for internal combustion engines of a forced-feed lubrication type crank shaft is provided, consisting semicircular bearings. An inner surface of the semicircular bearings is provided with a circumferential groove formed on the inner surface within a maximum circumferential angle range of 45 degrees, measured from one circumferential end facing the same direction as a rotational direction of the crankpin toward a circumferential center region of the semicircular bearing, each of the semicircular bearings having two circumferential ends which are of butt ends brought into contact with those of a mating semicircular bearing. In an assembled state, an axial groove is formed on an inner surface of the semicircular bearings so as to extend along the butt end throughout a full length between both axial ends of the semicircular bearing, whereby the axial groove, as a lubricant-oil flow channel, is connected with the circumferential groove.

8 Claims, 4 Drawing Sheets

CONNECTING ROD BEARING FOR INTERNAL COMBUSTION ENGINES

TECHNICAL BACKGROUND

The present invention relates to a connecting rod bearing for internal combustion engines, which consists of a pair of semicircular bearings, which rotatably supports a crankpin which connects a connecting rod and a crank shaft, and in which lubricant oil fed to an inner surface of a main bearing supporting the crank shaft is fed to an inner surface of the connecting rod bearing through an internal lubricant-oil path formed in the crank shaft.

A crank shaft of an internal combustion engine is supported in a lower portion of a cylinder block of the internal combustion engine at a journal section thereof through a main bearing consisting of a pair of semicircular bearings. In the main bearing, lubricant oil discharged from an oil pump is transferred, through an oil gallery formed in the cylinder block wall and a through hole formed in the wall of the main bearing, to a lubricant groove formed along the inner surface of the main bearing. In addition, a first lubricant-oil path is radially formed in the crank journal section, openings of both ends of the first lubricant-oil path is connected to the lubricant groove, a second lubricant-oil path is formed so as to branch off from the radial first lubricant-oil path in the crank journal section to pass through a crank arm, and the second lubricant-oil path is fluid communication with a third lubricant-oil path radially formed in a crankpin. Thus, the lubricant oil, which is fed from the oil gallery in the cylinder block wall via the through hole formed in the wall of the main bearing into the lubricant groove formed along the inner surface of the main bearing, flows in the first to third flow lubricant-oil path and be supplied between the crankpin and a sliding surface of the connecting rod bearing from an outlet port of an end portion of the third lubricant-oil path.

The lubricant oil, which is fed from the cylinder block of the engine through the crank journal section to the connecting rod bearing, might accompany foreign substances existing in the respective lubricant-oil path. If such foreign substances accompanied with the lubricant oil is fed between the crankpin and the sliding surface of the connecting rod bearing, there is a risk that they damage the sliding surface of the connecting rod bearing. The foreign substances entered between the crankpin and the sliding surface of the connecting rod bearing are required to be quickly discharged from the sliding surface to outside.

As a countermeasure against the foreign substances admixed in the lubricant oil, there has been a proposal that a circumferential lubricant groove is provided on an inner surface of one semicircular bearing of a main bearing, supporting a crank journal section, throughout an overall circumferential length thereof, the main bearing consisting of a pair of semicircular bearings, which semicircular bearing has a through hole receiving a lubricant oil supply directly from an oil gallery in a cylinder block wall, whereby discharging the foreign substances accompanied with the lubricant oil. In the case where this idea to a connecting rod bearing, it was found by a test that a foreign substances discharge effect is not obtainable, and such a way is rather counterproductive, because the foreign substances not only stay in the circumferential lubricant groove formed on an overall circumferential inner surface of one semicircular bearing of the connecting rod bearing but also the foreign substances are dispersed throughout a sliding surface of the bearing resulting in that the connecting rod bearing is liable to be damaged.

This is because in general a housing holding a connecting rod bearing is deformed largely during operation of an internal combustion engine, so that a clearance between a crankpin and the connecting rod bearing is larger than a clearance between the crank journal section and the main bearing, and the foreign substances staying in the circumferential lubricant groove is liable to be spread throughout the sliding surface of the bearing including a primary load bearing section which is a circumferential center region of the semicircular bearing whereby the connecting rod bearing suffers increased damages as compared with a conventional connecting rod bearing without such a circumferential lubricant groove. This was confirmed by a test Prior Art Publication 1: JP-A-8-277831
Prior Art Publication 2. JP-A-2005-69283

BRIEF SUMMARY OF THE INVENTION

An object of the present invention is to provide a connecting rod bearing capable of quickly discharging foreign substances accompanied with lubricant oil fed from a cylinder block of an internal combustion engine to the connecting rod bearing via a crank journal section.

MEANS FOR SOLVING THE PROBLEM

Under the object, according to the present invention, there is provided the following connecting rod bearing for internal combustion engines.

A connecting rod bearing for internal combustion engines, wherein in the internal combustion engines, lubricant oil, supplied to an inner surface of a main bearing supporting a crank shaft through an inner lubricant-oil path extending from a journal section of the crank shaft to a radial through hole formed in a crank pin, is fed to an inner surface of the connecting rod bearing rotatably supporting the crankpin which connects a connecting rod to the crank shaft, wherein the connecting rod bearing consists of a pair of semicircular bearings held in a bearing housing of a big end of the connecting rod, one of the semicircular bearings being an upper semicircular bearing positioned at the big end side, and the other of the semicircular bearings being a lower semicircular bearing positioned at the side of a bearing cap which forms the bearing housing together with the big end, wherein the upper semicircular bearing is so assembled that a center of a circumferential length of the upper semicircular bearing is in alignment with the axis of the connecting rod, wherein each of the semicircular bearings has two circumferential ends which are of butt ends which are butted to those of the other mating semicircular bearing, wherein an inner surface of at least one of the semicircular bearings is provided with at least one circumferential groove which is formed on the inner surface within a maximum circumferential angle range of 45 degrees, from one butt end facing the same direction as a rotational direction of the crankpin to the circumferential center of the semicircular bearing, and wherein in an assembled state of the semicircular bearings such that the butt ends thereof are brought into butt-contact with one another between the mating semicircular bearings, an axial groove is formed on an inner surface of at least one of the semicircular bearings so as to extend along the butt end, from which the circumferential groove extends, throughout a full length between both axial ends of the semicircular bearing, the axial ends being parallel to a phantom plane perpendicularly intersecting the axis of the connecting rod bearing, whereby the axial groove, as a lubricant-oil path, communicates with the circumferential groove.

Preferably, the circumferential groove has a width of 1 to 7 mm and a depth of 0.1 to 0.5 mm.

Preferably, the axial groove has a width of less than 2 mm and a depth of 0.1 to 0.5 mm.

In one embodiment of the invention, the circumferential groove is formed at the center between the both axial ends parallel to a phantom plane perpendicularly intersecting the axis of the connecting rod bearing. While an outlet port of the radial through hole formed in the crankpin, the radial through hole being a part of the internal lubricant-oil path of the crank shaft is usually alignment with the center between the both axial ends, it is possible to allow the lubricant oil to smoothly introduce into the circumferential groove by making the circumferential groove in alignment with the outlet port of the radial through hole in the crankpin, whereby foreign substances accompanied with the lubricant oil are liable to smoothly flow in the circumferential groove and further into the axial groove.

In another embodiment of the inventions the circumferential groove is so formed that a cross sectional area thereof becomes larger from a position in the direction of a circumferential center of the inner surface toward the butt end. According to such a configuration, the velocity of lubricant oil in the circumferential groove becomes slow from a position in the direction of the circumferential center toward the butt end of the semicircular bearings so that foreign substances accompanied with the lubricant oil flow in the groove without deviating from the circumferential groove.

In still another embodiment of the invention, the cross sectional area of the circumferential groove at a connection portion with the axial groove is larger than a cross sectional area of the axial groove. According to such a configuration, the velocity of lubricant oil in the axial groove becomes higher than that in the circumferential groove, so that foreign substances accompanied with the lubricant oil reaching the axial groove are quickly discharged from the axial groove to outside. With regard to the term of "the cross sectional area of the axial groove", in an assembled state of the pair of semicircular bearings wherein the butt ends of the semicircular bearings are brought into butt-contact with one another, and wherein the axial groove exists along the overall circumferential ends of both of the semicircular bearings, supposed that a phantom plane perpendicular to the axis of the connecting rod bearing intersects the axial groove and a phantom inner surface of the connecting rod bearing, which phantom inner surface is an extension of the actual inner surface of the connecting rod bearing and defines a groove space of the axial groove, to define an intersection area, the above term is defined by this intersection area.

In still another embodiment of the invention, the axial groove includes an oil relief and a crash relief which are formed in an inner surface of the bearing adjacent to the butt ends of the semicircular bearings. Although lubricant oil and foreign substances are discharged to outside of the axial direction through the oil relief and the crash relief in the conventional semicircular bearings as well, it was found by a test result that most of the foreign substances remain in the crash relief. In this embodiment of the invention in which the axial groove including the oil relief and/or the crash relief is provided, foreign substances, which have been liable to remain in the crash relief, can be smoothly discharged to outside of the bearing. Here, the meaning of the words "the axial groove includes an oil relief and/or a crash relief" is that while thicknesses of both circumferential end regions (i.e. those butted to each another between the pair of semicircular bearings) at the opening side of the semicircular bearing are made thinner than a thickness of the circumferential center region to form the oil relief and the crash relief, depths of the circumferential grooves are formed to be larger than a thickness reduction value in the region of the oil relief or the crash relief.

In still another embodiment of the invention, the circumferential grooves and the axial grooves are formed axisymmetrically with respect to the axis of the connecting rod bearing in both of the pair of semicircular bearings. According to such a configuration, a frequency when the radial through hole formed in the crankpin is repeatedly in oil communication with the circumferential groove of the connecting rod bearing during rotation of the crankpin when the engine is operated, increases as compared with the case of a single circumferential groove, whereby foreign substances contained in the lubricant oil flowing in the circumferential groove and the axial groove are efficiently discharged to outside. When the radial through hole in the crankpin is oil communication with the circumferential groove of the connecting rod bearing, the foreign substances in the circumferential groove are smoothly and forcibly transferred to the axial groove by the lubricant oil supplied from the diametral through hole.

In the connecting rod bearing of the internal combustion engine as a still another embodiment of the invention, an inner surface of one of the semicircular bearings is provided with two circumferential grooves and two axial grooves, the circumferential groove being formed on the inner surface within a maximum circumferential angle range of 45 degrees measured from each of two butt ends, which are in butt-contact with those of a mating semicircular bearing, toward the circumferential center of the semicircular bearing, and, in an assembled state of the semicircular bearings such that the butt ends thereof are brought into butt-contact with one another between the mating semicircular bearings, the axial groove being formed on an inner surface of at least one of the semicircular bearings so as to extend along the both butt ends and further to extend throughout a full length between both axial ends of the semicircular bearing, the axial ends being parallel to a phantom plane perpendicularly intersecting the axis of the connecting rod bearing, whereby the axial groove, as a lubricant-oil flow channel, communicates with the both circumferential grooves.

In the connecting rod bearing of the internal combustion engine as a still another embodiment of the invention, an inner surface of each of the semicircular bearings is provided with two circumferential grooves and two axial grooves, the respective circumferential groove being formed on the inner surface within a maximum circumferential angle range of 45 degrees measured from each of two butt ends, which are in butt-contact with those of a mating semicircular bearing, toward the circumferential center of the semicircular bearing, and, in an assembled state of the semicircular bearings such that the butt ends thereof are brought into butt-contact with one another between the mating semicircular bearings, the respective axial groove being formed on an inner surface of at least one of the semicircular bearings so as to extend along the both butt ends and further to extend throughout a full length between both axial ends of the semicircular bearing, the axial ends being parallel to a phantom plane perpendicularly intersecting the axis of the connecting rod bearing, whereby the axial groove, as a lubricant-oil flow channel, is connected with all the circumferential grooves.

ADVANTAGE OF THE INVENTION

According to the present invention, the inner surface of at least one of the semicircular bearings is provided with at least one circumferential groove which is formed on the inner surface within a maximum circumferential angle range of 45 degrees, from one butt end facing the same direction as a rotational direction of the crankpin to the circumferential center of the semicircular bearing, each of the semicircular bearings having two circumferential ends which are of butt ends which are butted to those of the other mating semicircular bearing, and, upon operation of the engine, lubricant oil, being supplied via the internal lubricant-oil path extending from the crank journal section to the through hole in a diametral direction of the crankpin, is fed between the crankpin and the connecting rod bearing from the diametral through hole, whereby the lubricant oil together with foreign substances accompanied thereby smoothly flows through the circumferential groove toward the butt ends of a pair of semicircular bearings in conformity with the rotational direction of the crankpin. This flow matches with the rotational direction of the crankpin relative to the connecting rod bearing to enable movement of foreign substances accompanied by the lubricant oil along the circumferential groove to be smooth.

Moreover, since the connecting rod bearing of the present invention employs a configuration that, in an assembled state of the semicircular bearings such that the butt ends thereof are brought into butt-contact with one another between the mating semicircular bearings, an axial groove is formed on an inner surface of at least one of the semicircular bearings so as to extend along the butt end, from which the circumferential groove extends, throughout a full length between both axial ends of the semicircular bearing, the axial ends being parallel to a phantom plane perpendicularly intersecting the axis of the connecting rod bearing, whereby the axial groove, as a lubricant-oil flow channel, communicates with the circumferential groove, the circumferential groove and the axial groove intersect and communicate with each other in a T shape, and thereby lubricant oil flowing through the circumferential groove does not make toward the sliding surface of the other mating bearing forming a pair but changes a going-direction to flow to the axial groove; thus, the lubricant oil is discharged to an outside from the both axial ends of the connecting rod bearing.

Therefore, the object of the present invention can be achieved, which is to quickly discharge foreign substances, contained in lubricant oil sent to a connecting rod bearing from a cylinder block of an internal combustion engine through a journal section of a crank shaft, from the connecting rod bearing whereby preventing damage of the bearing.

DETAILED DESCRIPTION OF THE INVENTION

Embodiment 1

Figure 1:
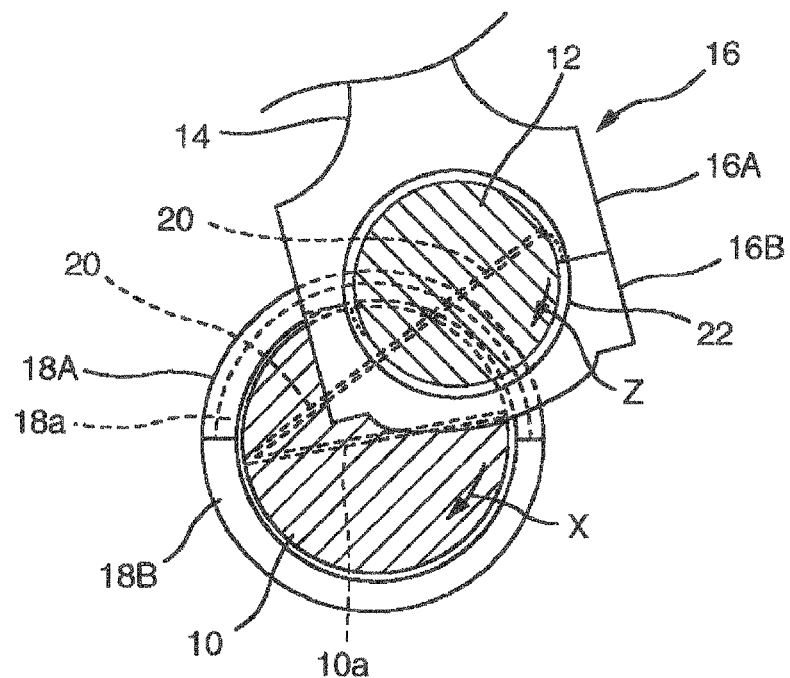
FIG. 1 is a schematic drawing showing that a crank shaft of the internal combustion engine is sectioned in a crank journal section and a crankpin, respectively.

FIG. 1 is a schematic view of a crank shaft of the internal combustion engine, in which the crank shaft is sectioned in a crank journal section and a crankpin, respectively, wherein there are shown a crank journal section 10, a crankpin 12 and a connecting rod 14. With regard to positional relationships among these three members in a vertical direction to the drawing sheet, the crank journal section 10 is present closest to the back surface of the drawing sheet, and the crankpin 12 is present in front thereof, wherein the crankpin 12 is surrounded by a big end housing 16 of the connecting rod 14 of which the other end carries a piston.

The crank journal section 10 is supported at a lower portion of a cylinder block of the internal combustion engine by intermediate of a pair of semicircular bearings 18A and 18B. In the semicircular bearing 18A positioned at an upper side in the drawing, a lubricant groove 18a is formed over the entire length of the inner surface thereof.

In addition, the crank journal section 10 has a through hole 10a in a diameter direction thereof, and when the crank journal section 10 rotates in a direction of the arrow X, the openings of both ends of the through hole 10a are alternately connected to the lubricant groove 18a.

A lubricant-oil path 20 is formed in the crank shaft through the crank journal section 10, a not-shown crank arm and the crankpin 12.

Figure 2:
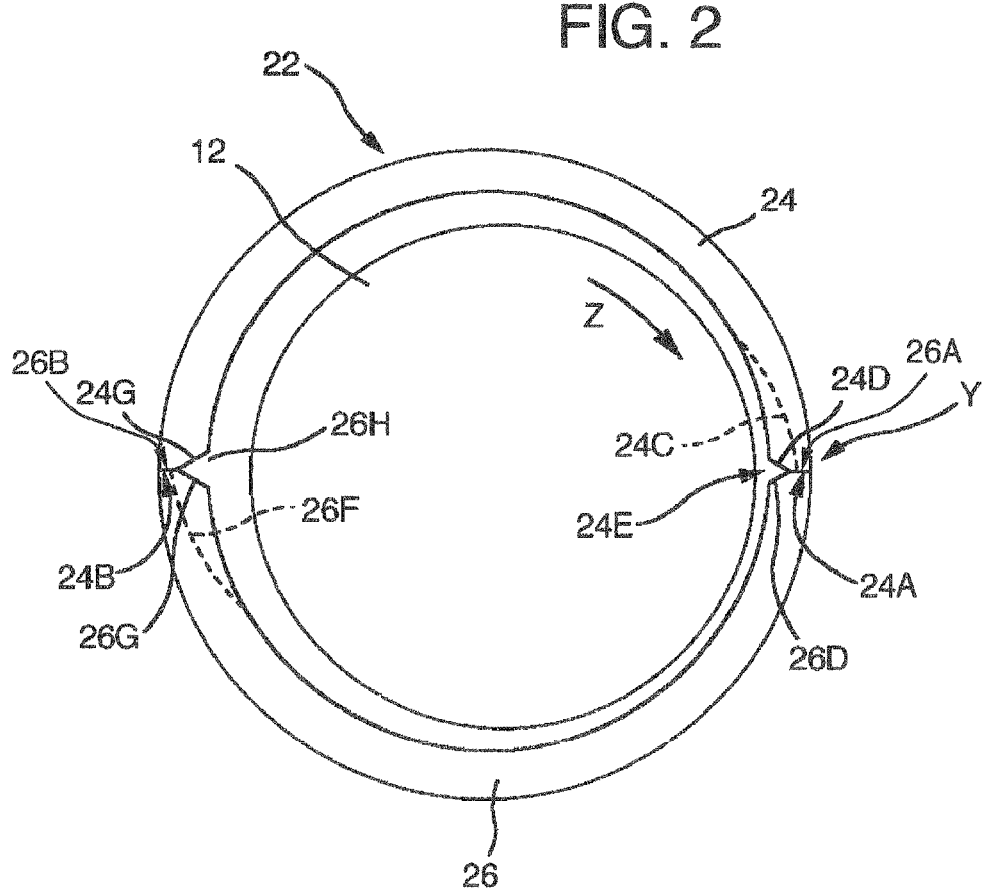
FIG. 2 is a transversely sectional view to illustrate a relationship between the rotating crankpin and the connecting rod bearing.
Figure 3:
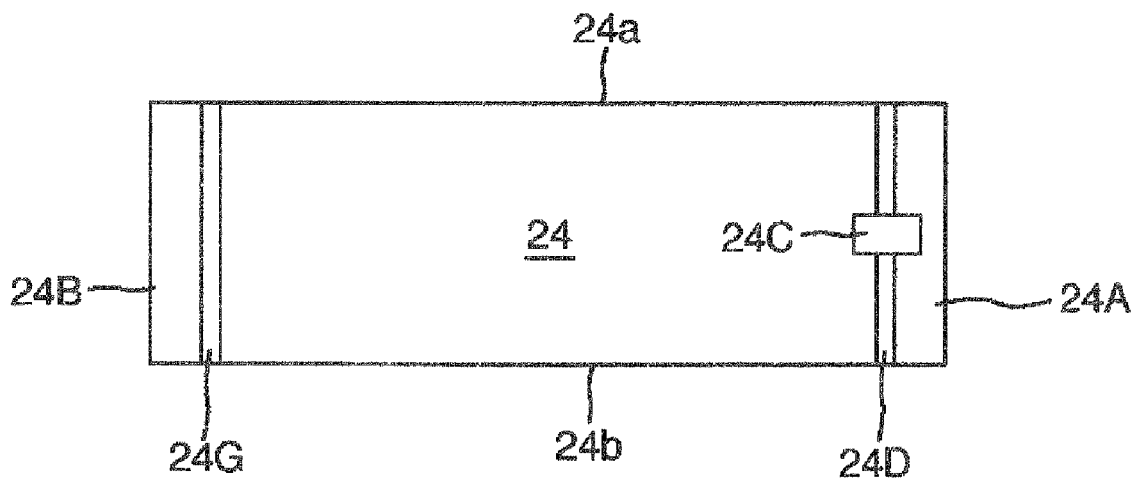
FIG. 3 is a drawing showing an inner surface of the upper semicircular bearing of the connecting rod bearing shown in FIG. 2.
Figure 4:
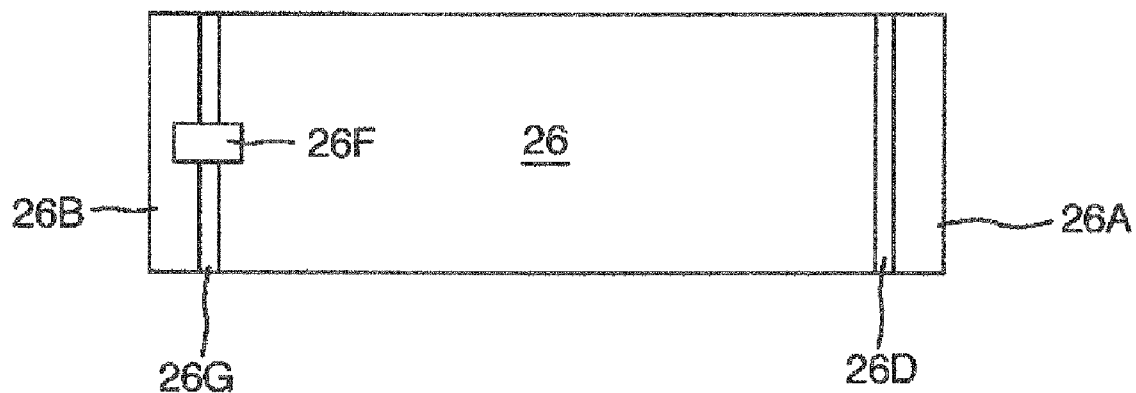
FIG. 4 is a drawing showing an inner surface of the lower semicircular bearing of the connecting rod bearing shown in FIG. 2.
Figure 5:
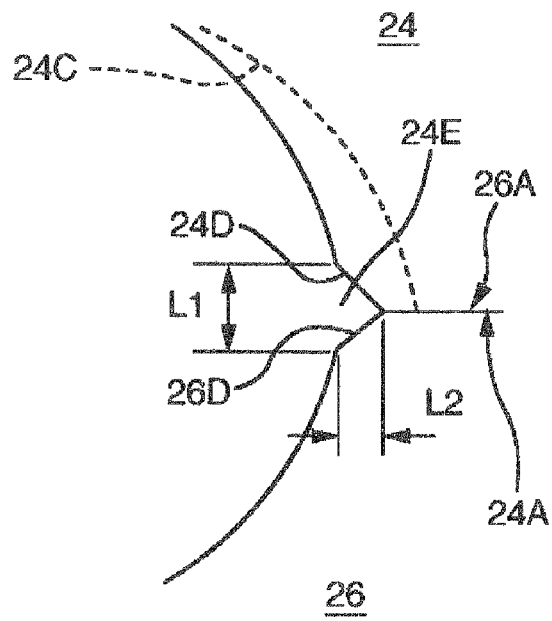
FIG. 5 is an enlarged view of a portion indicated by the arrow Y shown in FIG. 2.
Figure 6:
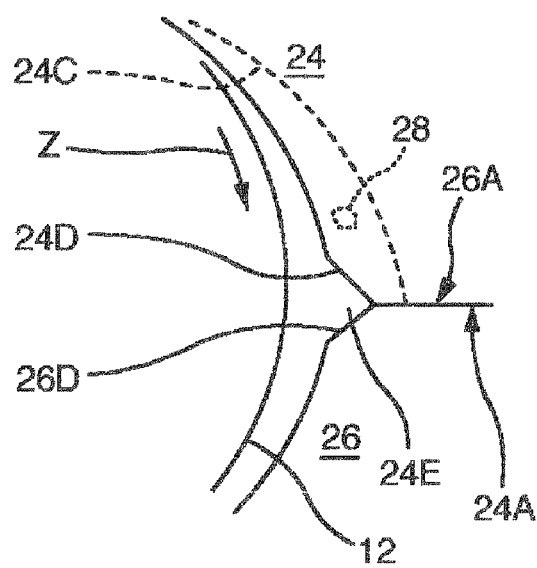
FIG. 6 is a drawing showing a size relationship and so one between the upper and the lower semicircular bearings shown in FIG. 5.

The crankpin 12 is held in the big end housing 16, which consists of a big end housing 16A of the connecting rod side and another big end housing 16B of the cap side, of the connecting rod 14 through a pair of semicircular bearings 24 and 26. A connecting rod bearing 22 is configured with the semicircular bearings 24 and 26 by assembling butt ends thereof which are butted to each other. FIGS. 2 to 4 illustrate the semicircular bearings 24 and 26 configuring the connecting rod bearing 22 in detail in the semicircular bearing 24, a circumferential groove 24C corresponding to a circumferential length within a circumferential angle of 45 degrees is formed from a one end 24A of circumferential ends 24A and 24B thereof toward circumferential central portion. The circumferential groove 24C is positioned at a central portion of an axial length (a length between both axial ends 24a and 24b in an axial direction) of the semicircular bearing 24. A slant surface 24D is formed by sectioning a part of the inner surface of the end 24A of the semicircular bearing 24 over the overall length between both axial ends 24a and 24b parallel to a phantom plane perpendicularly intersecting an axis of the bearing. The slant surface 24D defines an axial groove 24E, having a cross-sectional triangular form, in cooperation with a corresponding slant surface 26D formed in the mating semicircular bearing 26.

Although FIG. 2 shows a preferable embodiment semicircular bearings 24 and 26 of which circumferential ends 24A, 24B, 26A and 26B (FIGS. 3 and 4) are provided with the slant surfaces 24D, 24G, 26D and 26G, this does not limit the invention. The slant surface may be provided in at least one of both the semicircular bearings.

In FIG. 2, a circumferential groove 24C of the semicircular bearing 24 is formed in the end 24A facing the same direction as a rotational direction (the arrow Z) of the crankpin 12.

In addition, the slant surface 26D is formed in one end 26A of the circumferential ends 26A and 26B of the semicircular bearing 26.

Although a circumferential groove and an axial groove are not necessarily required to be provided in the other circumferential ends 24B and 26B of the semicircular bearings 24 and 26, FIGS. 2 to 4 illustrate examples of providing the circumferential grooves and axial grooves in the circumferential ends 24B and 26B, as well. Such circumferential groove and axial groove are formed in the circumferential ends 26B and 24B in an axisymmetry with the circumferential groove 24C and axial groove 24E of the circumferential ends 24A and 26A, with respect to a bearing central line (that is, axis) of the connecting rod bearing, to configure an axial groove 26H partitioned and formed by a circumferential groove 26F and slant surfaces 26G and 24G. The circumferential groove 26F is also formed in the end 26B facing the same direction as the rotational direction of the crankpin 12 for the semicircular bearing 26, like the circumferential groove 24C.

The following is geometrical dimensions of this embodiment only for one example.

(1) A diameter of a lubricant-oil path 20 formed through the crankpin 12: 5 to 7 mm;

(2) Width of the circumferential grooves 24C and 26F: 1 to 7 mm;

(3) Depth of the circumferential grooves 24C and 26F: 0.1 to 0.5 mm (NB: This size was determined taking a size of foreign substances into consideration.) In the semicircular bearing, generally, an oil relief or a crash relief has been formed, wherein the oil relief is so formed that a thicknesses of circumferential both end regions, which are brought into butt-contact with the mating semicircular bearing, is made thinner than that of the circumferential center region, and that the thicknesses of circumferential both end regions is made to be gradually thinner toward the circumferential ends, and wherein the crash relief is so formed that a thickness of the circumferential both end regions are made locally thinner. In such a case, the depths of the circumferential grooves 24C and 26F may be made larger than a reduction thickness value of the semicircular bearing in the region of the crash relief or the oil relief in the case where a thickness of the circumferential center region of the semicircular bearing is regarded as a reference thickness;

(4) Length of the circumferential grooves 24C and 26F: This is a circumferential length corresponding to a circumferential angle of up to 45 degrees from one of the circumferential ends toward the circumferential center. Taking into consideration that the circumferential center region of the semicircular bearing 22 bears a highest load, the above angle has been defined so as to avoid the circumferential center region;

(5) Groove width (L1) of the axial grooves 24E and 26H: less than 2 mm;

(6) Groove depth (L2) of the axial grooves 24E and 26H: 0.1 to 0.5 mm; and (7) Crash relief: The crash relief is formed on an inner surface of each end region of the circumferential ends 24A, 24B, 26A and 26B of the semicircular bearings 24 and 26. A circumferential length size of the crash relief extending from the circumference end toward the circumferential center region is 3 to 15 mm. A reduction thickness value of the semicircular bearing in the region of the crash relief is 0.01 to 0.05 mm in the case where a thickness of the circumferential center region of the semicircular bearing is regarded as a reference thickness.

The connecting rod bearing of this embodiment is configured as above and the function thereof will now be described.

During operation of the engine, lubricant oil is fed from the oil gallery provided in the cylinder block into the lubricant groove 18a via an opening formed through the wall of the semicircular bearing 18A which is one of the pair of the semicircular bearings 18A and 18B configuring the main bearing for supporting the crank journal section 10, and which has the lubricant groove 18a formed in the inner surface of the semicircular bearing 18A. Although the openings of both ends of the radial through hole 10a intermittently communicate with the lubricant groove 18a, a pressure of lubricant oil operates in the through hole 10a upon the communication and further a supply pressure of lubricant oil acts also on the lubricant-oil path 20 being connected with the through hole 10a, whereby the lubricant oil is fed from an outlet port (opening) of the lubricant-oil path 20 present on the outer surface of the crankpin 12 into the sliding surface between the crankpin 12 and the connecting rod bearing 22. However, when the outlet port (opening) of the lubricant-oil path 20 intermittently communicates with the circumferential grooves 24C and 26F according to rotation of the crankpin 12, a large amount of lubricant oil is introduced into the circumferential grooves 24C and 26F, and the foreign substance 28 accompanied by the lubricant oil and the foreign substance 28 already present in the circumferential grooves 24C and 26F flow away along the circumferential grooves. This flow is ensured by the presence of the axial grooves 24E and 26H being in oil communication with the circumferential grooves 24C and 26F. Most of the foreign substances 28 flow through the circumferential grooves 24C and 26F to arrive at the axial grooves 24E and 26H are introduced into the axial grooves 24E and 26H, to be discharged to outside of the bearing from both axial ends parallel to a phantom plane perpendicularly intersecting the axis of the bearing. The reason is that, since there are no circumferential grooves in the mating semicircular bearings, the foreign substances are difficult to be introduced into the sliding surface of the mating semicircular bearings.

In addition, since the circumferential grooves 24C and 26F are present at the side of the circumferential ends of the semicircular bearings 24 and 26, which circumferential ends face to the same direction as the rotational direction of the crankpin 12, the foreign substances 28 existing in the circumferential grooves 24C and 26F are promoted to be discharged.

In this case, if cross-sectional areas of the circumferential grooves 24C and 26F are gradually larger toward the circumferential ends, the lubricant oil and the foreign substances 28 flowing through the circumferential grooves 24C and 26F flow slowly toward the circumferential ends, so that the foreign substances 28 in the circumferential grooves are caused to surely flow, together with the lubricant oil, toward the axial grooves. When approaching to the axial grooves, the velocity of the lubricant oil and the foreign substances 28 becomes slow, so that it is possible to avoid an occurrence of a phenomenon that the lubricant oil and the foreign substances flow to cross over the axial grooves into the mating semicircular bearing under the action of inertia.

Further, if cross-sectional areas of the circumferential grooves 24C and 26F are made larger than those of the axial grooves 24E and 26H, the velocity of the lubricant oil and the foreign substances which flow relatively slowly through the circumferential grooves 24C and 26F becomes higher in the axial grooves 24E and 26H, so that the foreign substances are quickly discharged from the both axial ends to outside of the bearing.

Embodiment 2

Figure 7:
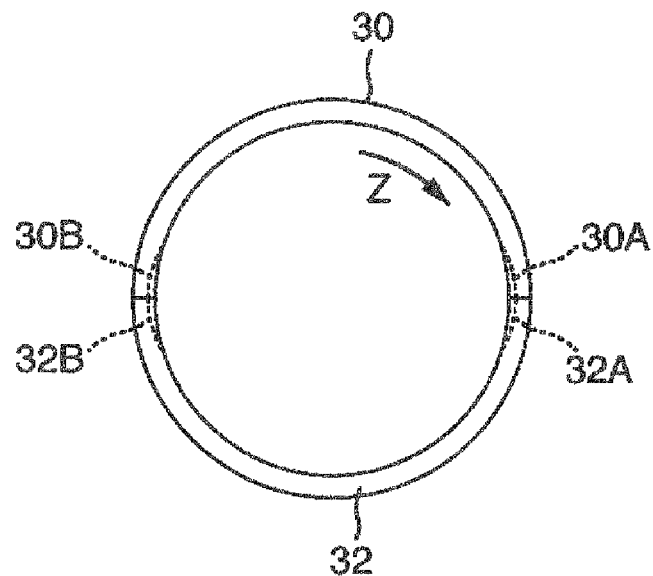
FIG. 7 is a side view of the connecting rod bearing related to Embodiment 2 of the present invention.

In Embodiment 1, while there has been afore described about the connecting rod bearing 22 which is of a combination of the semicircular bearing 24, whose circumferential groove 24C is formed in only the end 24A positioned at the arrow Z side which is a rotation direction of the crankpin 12, and the semicircular bearing 26, whose circumferential groove 26F is formed in only end 26B positioned at the arrow Z side which is a rotation axis of the crankpin 12, Embodiment 2 (i.e. a modification) shown in FIG. 7 has more or less lower effect than Embodiment 1. However, a discharge effect of foreign substances which can be satisfactory in term of a practical use can be obtained. The Embodiment 2 uses a connecting rod bearing consisting of a semicircular bearing 30 positioned at an upper side (that is, the big end housing side of the connecting rod) and a connecting rod bearing configured of a semicircular bearing 32 positioned at a lower side (that is, the big end housing cap side). In this case, both of the semicircular bearings 30 and 32 include circumferential grooves 30A, 30B, 32A and 32B having the same shape as the circumferential grooves 24C and 26F in the Embodiment 1 and axial grooves (not shown) having the same shape as the axial grooves 24E and 26H in Embodiment 1, in the inner surface of the circumferential both ends. Since the connecting rod bearing of this embodiment has not only the circumferential grooves 30A and 32B for flowing away the foreign substances to the axial grooves of the rotational direction (the arrow Z direction) of the crankpin 12 but also the circumferential grooves 30B and 32A of reversely rotational direction of the crankpin 12, and when the semicircular bearings are installed in the connecting rod, an error such as one installed in a state where the circumferential grooves are positioned only at the ends of the reversely rotational direction of the crankpin 12 can be prevented.

Embodiment 3

Figure 8:
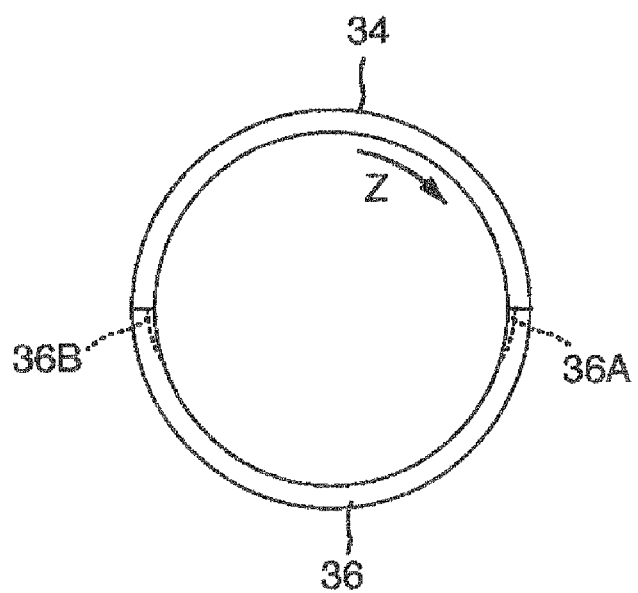
FIG. 8 is a side view of the connecting rod bearing related to Embodiment 3 of the present invention.

As shown in FIG. 8, Embodiment 3 (a modified type) uses a connecting rod bearing configured of a semicircular bearing 34 positioned at an upper side (i.e. the big end housing side of the connecting rod) and a connecting rod bearing configured of a semicircular bearing 36 positioned at a lower side (i.e. the big end housing cap side). The semicircular bearing 34 has an inner surface without a circumferential groove. The semicircular bearing 36 has circumferential grooves 36A and 36B having the same shape as the circumferential grooves 24C and 26F in Embodiment 1 and axial grooves (not shown) having the same shape as the axial grooves 24E and 26H in Embodiment 1, in the inner surface of the circumferential both ends. Embodiment 3 shown in FIG. 8 has more or less lower effect than Embodiment 1; however, an effect of exhausting foreign substances which can be satisfactory in term of a practical use can be obtained. Since the connecting rod bearing of this embodiment has not only the circumferential grooves 36B for flowing away the foreign substances to the axial grooves of the rotational direction (the arrow Z direction) of the crankpin 12 but also the circumferential grooves 36A of reversely rotational direction of the crankpin 12, and when the semicircular bearings are installed in the connecting rod, an error such as one installed in a state where the circumferential grooves are positioned only at the ends of the reversely rotational direction of the crankpin 12 can be prevented. In addition, the semicircular bearing positioned at the upper side (that is, the big end housing side of the connecting rod) may be taken as a semicircular bearing 36 having circumferential grooves and the semicircular bearing positioned at the lower side (that is, the big end housing side of the cap) may be taken as a semicircular bearing 34 having no well-known lubricant groove along a full length in a circumferential direction.

Test for Confirming Foreign Substances Discharge Performance

The subject test was conducted for the connecting rod bearings of Embodiments 1 to 3, a connecting rod bearing having no circumferential grooves and axial grooves and connecting rod bearings of Comparative Examples 1 to 3. Comparative Example 1 is a connecting rod bearing which has only axial grooves having the same shape as Embodiment 1 in the conventional connecting rod bearing, Comparative Example 2 is a connecting rod bearing which has the circumferential grooves having the same shape as Embodiment 2 but has no axial grooves, and Comparative Example 3 is a connecting rod bearing which has the circumferential grooves whose depth aid width are constant throughout a circumferential full length but has no axial grooves. The test object and the test condition are as follows.

TABLE 1

Specimens for Test

| Type | Circumferential Groove (size at connecting portion with axial groove) | | | Axial Groove | |
|---|---|---|---|---|---|
| | Arrangement (Position) | Width (mm) | Depth (mm) | L1 (mm) | L2 (mm) |
| Embodiment 1 | *30° from circumferential end (only one circumferential end region) | 1 | 0.3 | 0.6 | 0.3 |
| Embodiment 2 | *30° from circumferential end (both circumferential end regions) | 1 | 0.3 | 0.6 | 0.3 |
| Embodiment 3 | *30° from circumferential end (both circumferential end regions) | 1 | 0.3 | 0.6 | 0.3 |
| | No | No | No | 0.6 | 0.3 |
| Conventional Type | No | No | No | No | No |
| Comparative Example 1 | No | No | No | 0.6 | 0.3 |
| Comparative Example 2 | *30° from circumferential end (only one circumferential end region) | 1 | 0.3 | No | No |
| Comparative Example 3 | Entire circumferential length | 1 | 0.3 | No | No |

*Note: The shown angle is of a circumferential angle range measured from a circumferential end of a semicircular bearing, which corresponds to a circumferential groove length.

A driven rotation shaft (see Table 2) was supported with use of the connecting rod bearings shown in Table 1, and the rotation shaft was driven in a forced-feed lubrication state. The rotation shaft imitated crankpins. Lubricant oil is forcedly fed to the inner surface of a test bearing through a lubricant-oil flow path radially branched off from a central oil flow path in the crankpin. Prior to the test, a grease admixed with 1 mg of foreign substances consisting of fine particles was attached to an inner wall of the lubricant-oil flow path adjacent to an outlet port (opening) of the lubricant-oil flow path, which outlet port is present on the outer surface of the crankpin. The foreign particles are made of an iron based material, each of which particles has a long diameter of 0.17 to 0.2 mm and a thickness of 0.05 to 0.1 mm. The test condition is shown in Table 2. In the test of the connecting rod bearings, three specimens (N=3) were devoted for each bearing type.

TABLE 2

| | Test Condition | |
|---|---|---|
| Items | Size, Size such as pressure etc. | Unit |
| Shaft Diameter | 38 | mm |
| Bearing Width | 15 | mm |
| Surface Pressure | 4 | MPa |
| Rotational Number | 780 | r.p.m. |
| Test Time | 1 | hour |
| Lubricant oil (Type) | VG22 | — |
| Surface Roughness of Shaft | 0.8 | Rmax (μm) |

Test Result

After a rotation test for one hour respectively, the number of foreign particles is counted which remain attached to, or embedded in the inner surface of the cylindrical bearing consisting of a pair of upper and lower semicircular bearings. The smaller the remaining number of the foreign particles, the better an evaluation result is. A smaller number exhibits that more foreign particles were discharged from the bearing together with the lubricant oil. The test results exhibited that the remaining number (in average) of particles in the conventional type was about 280, that of Embodiment 1 was about 140, that of Embodiment 2 was about 175, that of Embodiment 3 was about 160, that of Comparative Example 1 was about 260, that of Comparative Example 2 was about 290, and that of Comparative Example 3 was about 320. Here, in the case where the remaining number of particles in the conventional type of about 260 is regarded as a reference value 100, a decrease rate (%) of the remaining number of particles of the respective specimen is as follows, Comparative Example 1: −7%,
Comparative Example 2: +4%,
Comparative Example 3: +14%,
Embodiment 1: −46%,
Embodiment 3: −38%, and
Embodiment 2: −32%.

From these results, Embodiment 1 shown in FIGS. 1 to 6 is the best in performance, Embodiment 3 shown in FIG. 8 is the second, and Embodiment 2 shown in FIG. 7 is the third. It has been confirmed that all the Embodiments exhibit a good discharge effect of foreign substances, which effect exceeds 30% or more as compared with conventional bearings.

The invention claimed is:

1. A connecting rod bearing for internal combustion engines,
wherein in the internal combustion engines, lubricant oil, supplied to an inner surface of a main bearing supporting a crank shaft through an internal lubricant-oil path of the crank shaft, is fed to an inner surface of the connecting rod bearing rotatably supporting a crankpin which connects a connecting rod to the crank shaft,
wherein the connecting rod bearing consists of a pair of semicircular bearings held in a bearing housing of a big end of the connecting rod, one of the semicircular bearings being an upper semicircular bearing positioned at the big end side, and the other of the semicircular bearings being a lower semicircular bearing positioned at the side of a bearing cap which forms the bearing housing together with the big end,
wherein the upper semicircular bearing is so assembled that a center of a circumferential length of the upper semicircular bearing is in alignment with the axis of the connecting rod,
wherein each of the semicircular bearings has two circumferential ends which are each butt ends which are butted to those of the other mating semicircular bearing when the bearings are assembled together,
wherein an inner surface of at least one of the semicircular bearings is provided with at least one circumferential groove which is formed on the inner surface within a maximum circumferential angle range of 45 degrees, from one butt end facing the same direction as a rotational direction of the crankpin to the circumferential center of the semicircular bearing, and
wherein in an assembled state of a pair of the semicircular bearings such that the butt ends thereof are brought into butt-contact with one another, an axial groove is formed on an inner surface of at least one of the semicircular bearings so as to extend along the butt end, from which the circumferential groove extends, throughout a full length between both axial ends of the semicircular bearing, whereby the axial groove, as a lubricant-oil flow channel, is connected with the circumferential groove.

2. The connecting rod bearing according to claim 1, wherein the circumferential groove is formed at the center between the both axial ends parallel to a phantom plane perpendicularly intersecting the axis of the connecting rod bearing.

3. The connecting rod bearing according to claim 1, wherein the circumferential groove has a width of 1 to 7 mm and a depth of 0.1 to 0.5 mm.

4. The connecting rod bearing according to claim 1, wherein the axial groove has a width of less than 2 mm and a depth of 0.1 to 0.5 mm.

5. The connecting rod bearing according to claim 1, wherein the circumferential groove is so formed that a cross sectional area thereof becomes larger from a position in the direction of a circumferential center of the inner surface toward the butt end.

6. The connecting rod bearing according to claim 1, wherein the cross sectional area of the circumferential groove at a connection portion with the axial groove is larger than a cross sectional area of the axial groove.

7. The connecting rod bearing according to claim 1, wherein the axial groove comprises at least one of an oil relief and a crash relief formed on the inner surface of the bearing in an adjacent region to the butt end of the semicircular bearing.

8. The connecting rod bearing according to claim 1, wherein the circumferential grooves and the axial grooves are formed axisymmetrically with respect to the axis of the connecting rod bearing in both of the pair of semicircular bearings.

* * * * *